Nov. 4, 1958 H. R. PHELPS 2,859,053
SHAFT SEAL
Filed July 29, 1955
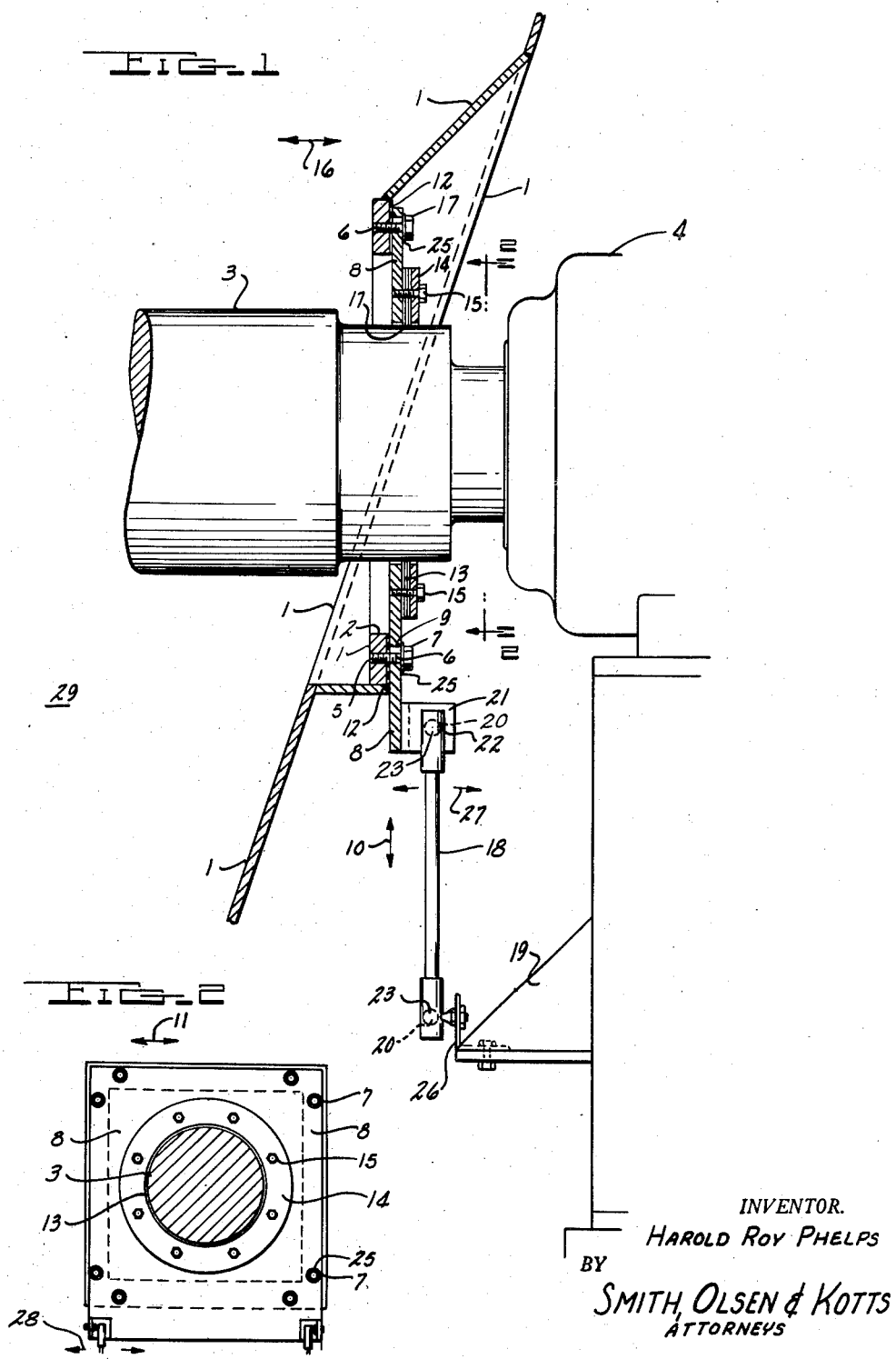
INVENTOR.
HAROLD ROY PHELPS
BY
SMITH, OLSEN & KOTTS
ATTORNEYS

United States Patent Office 2,859,053
Patented Nov. 4, 1958

2,859,053
SHAFT SEAL

Harold Roy Phelps, Detroit, Mich., assignor, by mesne assignments, to American Radiator & Standard Sanitary Corporation, New York, N. Y., a corporation of Delaware Application July 29, 1955, Serial No. 525,266

3 Claims. (Cl. 286—1)

This invention relates to a shaft seal, and more particularly to an arrangement permitting relative movement between the seal and the housing or wall on which it is mounted.

In many types of fan or blower constructions it is the usual practice to position an electric motor or other power source exteriorly of the fan housing and to extend a drive shaft from the motor through the housing to bearings located exteriorly of the fan housing. During operation of the fan the fan housing may heat up from room temperature to 800° F. or more. This temperature change results in an expansion of the fan housing, and due to the fact that the bearings for the drive shaft are located on independent supports exteriorly of the housing, the bearings and drive shaft do not shift radially in accordance with the expansive movement of the housing. As a result operation of the fan is accompanied by a relative movement between the fan housing and drive shaft, particularly in directions at right angles to the drive shaft axis.

In order to prevent leakage of air and heat from within the fan housing it is desirable to seal the joint which the drive shaft makes with the housing at points where the shaft extends through the housing walls. In many cases the fan is utilized as a dust-moving medium and the shaft seal in these cases has the further function of preventing leakage of dust from within the fan housing. Due to the expansive-contractive movement of the housing which takes place during and after fan operation, the shaft seal must necessarily be of such construction as to permit this movement of the fan housing while at the same time maintaining a seal between the shaft and housing. If the seal is fixedly secured on the housing there is danger that expansive-contractive movement of the housing will result in an uneven contact between the shaft seal and shaft such as to cause leakage of gas or dust, binding of the shaft, undue shaft wear, undue shaft seal wear, generation of heat from friction, and conduction of heat into the drive shaft bearings. It is desirable that the shaft seal be floatably mounted on the fan housing so as to accommodate the expansive-contractive movement of said housing and eliminate the leakage, wear and heat generation discussed above.

One object of the present invention is to provide a shaft seal which will continue to seal a joint between a shaft and housing wall even though the housing experiences expansive-contractive movement during and after operation of the shaft.

Another object is to provide a shaft seal for use on an angularly arranged wall member, which seal is capable of motion relative to the wall member and parallel thereto.

Another object is to provide a shaft seal for use with a shaft having a fixed axis of rotation and operating in a housing which, during operation of the shaft, is caused to move in the direction of the shaft axis as well as at right angles thereto.

Other objects of this invention will appear in the following description and appended claims, reference being had to the accompanying drawings forming a part of this specification wherein like reference characters designate corresponding parts in the several views.

In the drawings:

Fig. 1 is a cross-sectional view taken through a portion of a fan housing and showing a fan drive shaft extending therethrough, together with a floatably mounted shaft seal which constitutes the subject matter of the present invention; and Fig. 2 is a cross-sectional view taken on line 2—2 in Fig. 1.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In the drawings there is shown a portion on one wall of a fan housing indicated generally by the reference numeral 1. Space 29 is enclosed by the housing. Wall 1 includes a circular opening 2, and clearingly extended through said opening is a fan drive shaft 3, rotatably mounted in conventional bearing blocks 4 positioned exteriorly of the fan housing. Wall 1 is provided with a plurality of threaded openings 5 which receive the threaded portions of threaded pins 6. Each of pins 6 is provided with a head 7 which overlies a washer 25 encircling pin 6 and movably positioned on the exterior face of a plate 8. Plate 8 is provided with a series of circular openings 9 which loosely receive pins 6 so as to provide for relative movement between wall 1 and plate 8 in the directions of arrows 10 and 11. In this connection it will be noted that openings 9 are of greater radial dimension than pins 6 and that washers 25 are of a greater radial dimension than openings 9 so as to hold plate 8 on wall 1 while at the same time permitting the before mentioned movements in the directions of arrows 10 and 11. In order to seal the joint between plate 8 and wall 1 a gasket is provided at 12, and in order to seal the joint between plate 8 and shaft 3 a gasket is provided at 13. Mounting of gasket 13 on plate 8 is effected by means of a ring member 14 and a series of bolts 15.

During operation of the fan within the fan housing, wall 1 changes its temperature so as to experience a simultaneous three-dimensional expansive-contractive movement in the directions of arrows 10, 11 and 16. Exterior bearing 4 however does not undergo a corresponding temperature change, and accordingly the axis of shaft 3 does not move in accordance with the movement of wall 1. The loose coaction between pins 6 and openings 9 accommodates movement of wall 1 in the directions of arrows 10 and 11, but in order that plate 8 and interior edge 17 of gasket 13 will not unduly press or wear against the adjacent surface of shaft 2, it is necessary that plate 8 be supported in its illustrated position without any tendency for it to move from its designed position. In order to support plate 8 while at the same time permitting movement of wall 1 in the direction of arrows 10, 11 and 16 there are provided two rods 18, the lower ends of which are universally mounted on a fixed supporting structure 19 by means of brackets 26 and ball and socket joints 20, the interior portions of which are not shown. The upper ends of rods 18 are universally connected at 22 to brackets 21 which are welded or otherwise secured on lower portions of plate 8. Universal connection 22 is a ball-socket joint of conventional construction and therefore the interior details of said connection have not been illustrated.

During operation of the fan, wall 1 will experience a three-dimensional expansive-contractive movement in the directions of arrows 10, 11 and 16, and during this movement plate 8 will, due to the play allowed between openings 9 and pins 6, allow movement of wall 1 without substantial change in the horizontal or vertical position of gasket 13. Rods 18 will pivot slightly around points 23 which are the centers of rotation of universal connections 20. Due to the universal connections 22, rods 18 are free to pivot about points 23, both in the directions of arrows 27 and 28 and all angular combinations thereof. At the same time rods 18 support gasket 13 at substantially the same horizontal level throughout fan operation, irrespective of the expansion of the fan housing the support given to gasket 13 by rods 18 prevents gasket edge 17, from rubbing with excessive pressure on shaft 3 under the weight of heavy plate 8. The pivoting of rod 18 will be accompanied by a very slight vertical movement of gasket 13, but the relatively long length of arms 18 is such that for all practical purposes this slight movement can be disregarded.

In most installations the axis of shaft 3 will be in a line in vertical registry with one horizontal centerline of the fan housing. In such installations the fan housing can be fixedly secured to a subjacent supporting structure at points in vertical registry with the drive shaft axis. Such securement causes the arrow 11 component of fan housing expansion to take place in opposite directions from points directly below the drive shaft axis. Such component of expansion results in little, if any change in the vertical center line of opening 2, and accordingly the arrow 11 component of motion for which compensation must be made is very small.

It will be understood however that by the use of the invention a seal can be constantly effected around the surface of shaft 3 even with relatively great expansive-contractive movements of fan housing wall 1 in the directions of arrows 10, 11 and 16 and angular combinations thereof.

Having thus described my invention, I claim:

1. The combination comprising a movable fan-housing wall; a rotary fan shaft extended clearingly therethrough with the axis of the shaft being fixed; a shaft seal comprising a gasket sealingly encircling the shaft; means floatably mounting said gasket for movement relative to the wall in directions angularly from the shaft axis, said mounting means comprising a plate in facial engagement with said wall, a fixed supporting structure, and movable support means interconnecting the plate and fixed supporting structure; said supporting means being independent of the wall for supporting the plate in a substantially fixed position with respect to the shaft axis while additionally permitting axial movement of said plate with the wall.

2. The combination comprising a movable fan-housing wall; a rotary fan shaft extended clearingly therethrough with the axis of the shaft being fixed; a shaft seal comprising a gasket sealingly encircling the shaft; means floatably mounting said gasket for movement relative to the wall in directions angularly from the shaft axis; said mounting means comprising a plate in facial engagement with said wall; means independent of the wall for supporting the plate in a substantially fixed position with respect to the shaft axis while additionally permitting axial movement of said plate with the wall; said supporting means comprising a fixed supporting structure, and a rod, one end of which is universally mounted on the fixed supporting structure and the other end of which is universally attached to the plate.

3. The combination comprising a movable fan-housing wall; a rotary fan shaft extended clearingly therethrough with the axis of the shaft being fixed; a shaft seal comprising a gasket sealingly encircling the shaft; means floatably mounting said gasket for movement relative to the wall in directions angularly from the shaft axis; said mounting means comprising a plate in facial engagement with said wall; means independent of the wall for supporting the plate in a substantially fixed position with respect to the shaft axis while additionally permitting axial movement of said plate with the wall; said supporting means comprising a fixed supporting structure, and a rod, one end of which is rotatably mounted on the fixed supporting structure and the other end of which is rotatably attached to the plate.

References Cited in the file of this patent

UNITED STATES PATENTS

| 1,081,443 | Godfrey | Dec. 16, 1913 |
| 1,541,902 | Collins | June 16, 1925 |
| 2,348,160 | Thornhill | May 2, 1944 |